United States Patent [19]

Mizuguchi et al.

[11] 3,901,201
[45] Aug. 26, 1975

[54] ELECTRONIC SPARK TIMING CONTROL SYSTEM FOR INTERNAL COMBUSTION ENGINE

[75] Inventors: Norio Mizuguchi, Yokosuka; Hiroshige Ozawa, Yokohama, both of Japan

[73] Assignee: Nissan Motor Co., Ltd., Yokohama, Japan

[22] Filed: Dec. 26, 1973

[21] Appl. No.: 427,902

[30] Foreign Application Priority Data
Dec. 26, 1972  Japan .................................. 47-48719

[52] U.S. Cl. .......................... 123/117 R; 123/32 EA
[51] Int. Cl. ............................................. F02p 5/00
[58] Field of Search .................... 123/117 R, 32 EA

[56] References Cited
UNITED STATES PATENTS

| | | | |
|---|---|---|---|
| 3,429,302 | 2/1969 | Scholl | 123/32 EA |
| 3,483,851 | 12/1969 | Reichardt | 123/32 EA |
| 3,626,455 | 12/1971 | Toda et al. | 123/117 R |
| 3,717,135 | 2/1973 | Mayashi et al. | 123/117 R |
| 3,738,339 | 6/1973 | Huntzinger et al. | 123/117 R |
| 3,749,073 | 7/1973 | Asplund | 123/117 R |
| 3,779,219 | 12/1973 | Saita | 123/117 R |
| 3,791,356 | 2/1974 | Saita | 123/117 R |
| 3,800,757 | 4/1974 | Finch | 123/117 R |

*Primary Examiner*—Charles J. Myhre
*Assistant Examiner*—Joseph A. Cangelosi

[57] ABSTRACT

Electromagnetic pick-up coils produce timing and reference timing pulses in synchronism with engine revolutions. These pulses occur at an adjustably spaced apart timing so that for starting operation ignition is provided at an advanced-timing using the timing pulse while inhibiting the reference timing pulse. For warming-up and normal operations, the timing pulse is inhibited while the reference pulse is enabled and delayed in accordance with a signal which varies in amplitude in accordance with particular timing characteristics of the engine for such operations. The voltage drop due to consumption of power by the engine starter during the starting operation has no adverse effect on the advance timing control during the starting operation.

2 Claims, 3 Drawing Figures

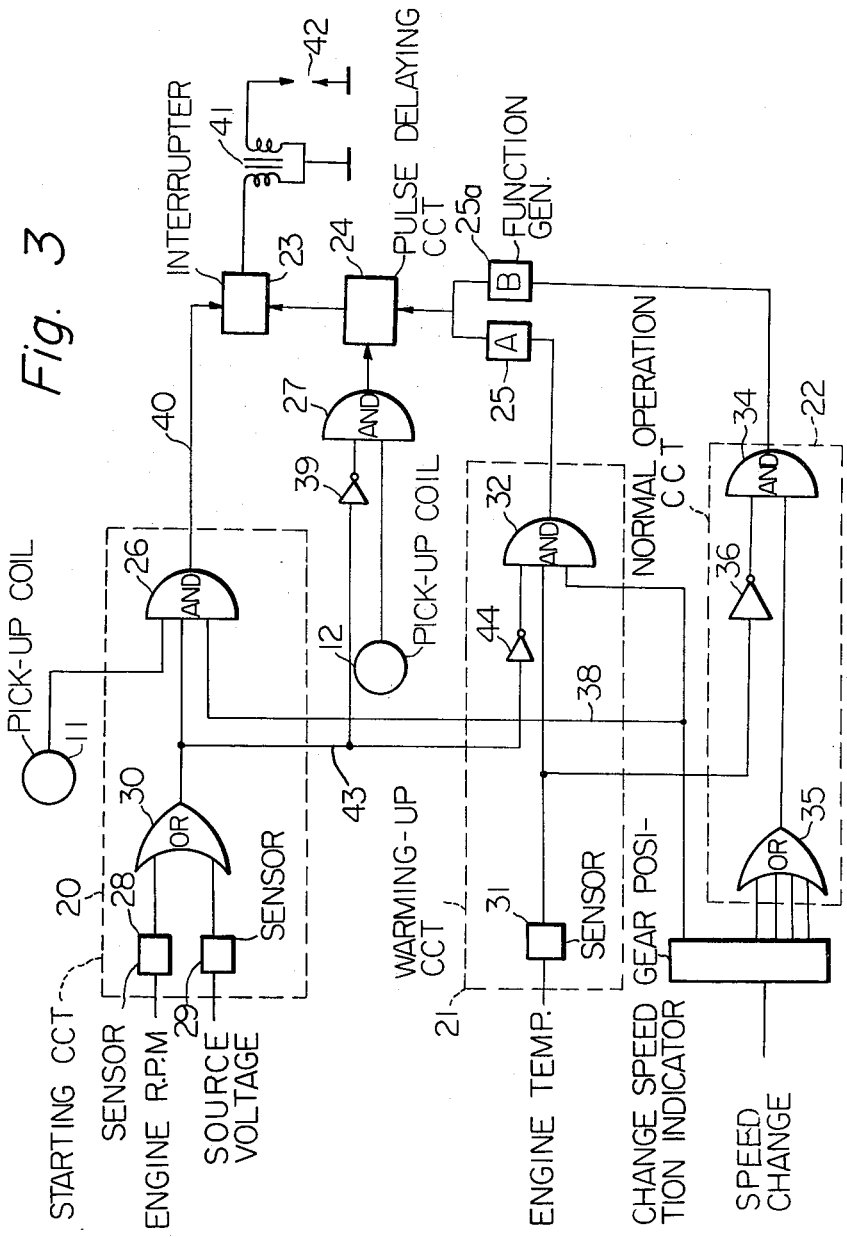

ELECTRONIC SPARK TIMING CONTROL SYSTEM FOR INTERNAL COMBUSTION ENGINE

The present invention relates generally to spark timing control systems and particularly to an electronic spark timing control system for internal combustion engines.

In a known electronic spark timing control system, a reference timing pulse generated in synchronism with engine revolutions is delayed in accordance with a voltage supplied from a function generator wherein the supplied voltage is varied in accordance with a desired spark timing characteristic of the engine. During starting operation it is necessary that the function generator provides a precisely controlled constant voltage. However, the function generator is usually powered from the same source of power as the engine starter. During the engine start-up period, the starter will draw much energy from the source and therefore insufficient power will be delivered to the function generator with accompanying difficulty in providing a low voltage of constant level to effect a precisely controlled delay of the reference timing pulse. Consequently substantial amounts of unburned fuel will be exhausted during the starting operation.

An object of the present invention is, accordingly, to provide an improved electronic spark timing control system which reduces the amount of unburned fuel exhausted during the starting operation.

Another object of the invention is to provide an improved electronic spark timing control system which minimizes the adverse effect of power source voltage drop on advance ignition during the starting operation.

A further object is to provide an improved spark timing control system which is efficient and simple in construction for satisfactory stability, and reliability.

Briefly stated, the present invention contemplates to use electromagnetic pick-up coils for producing in synchronism with engine revolutions a spark timing pulse and a reference timing pulse. These coils are disposed in the distributor housing and arranged at an adjustable spacing from each other so that the reference timing pulse occurs at a zero angle position of the crankshaft while the advance timing pulse occurs at a timing advanced from the reference timing pulse. For engine starting operation the advance timing pulse is enabled to provide ignition at an advance timing while the reference timing pulse is inhibited. For warmingup and normal operations the reference timing pulse is enabled and delayed in accordance with characteristic curves suitable for such operations while the advance timing pulse is inhibited. When the engine is started upon turning the starter key, an engine speed sensor and a source voltage sensor transmit a signal for enabling the advance timing pulse, while inhibiting the reference timing pulse. When the engine has been started and an engine temperature sensor transmits a signal indicating that the engine temperature is below a predetermined level, a warming-up circuit is energized for enabling the reference timing pulse while inhibiting the advance timing pulse. A function generator is also energized to generate a voltage varying in amplitude in accordance with the desired advance characteristic suitable for the warming-up operation. The function generator applies its output to a pulse delaying circuit to which the reference timing pulse is also applied. The reference timing pulse is thus delayed in accordance with the desired characteristic and provides ignition at the desired spark timing. Similarly, when the engine temperature has reached the predetermined temperature, no signal is transmitted and the engine is ready for normal operation. During the normal operation, another function generator is employed for delaying the reference timing pulse.

These and other objects and features of the present invention will become apparent to those skilled in the art when the detailed description is read in conjunction with the accompanying drawings, in which:

FIG. 3 is a schematic circuit diagram of a preferred embodiment of an electronic spark timing control system in accordance with the present invention.

Figure 1:
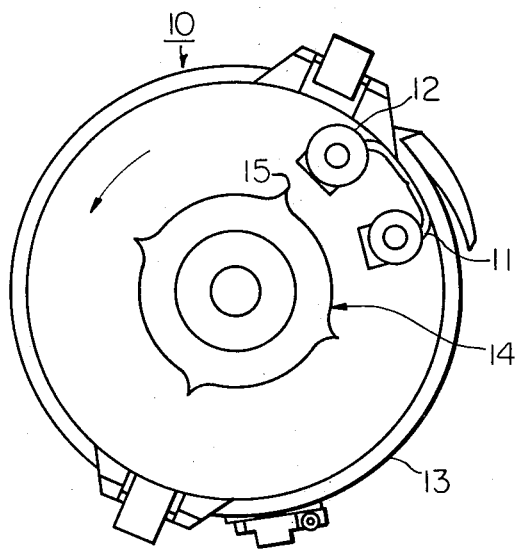
FIG. 1 is a plan view of a distributor of an engine provided with electromagnetic coils for generating reference and advanced timing pulses, respectively, in accordance with the invention.

Referring now to FIG. 1, a distributor 10 of conventional construction is shown and provided with electromagnetic pick-up coils 11 and 12 disposed on the periphery of the housing 13 thereof and adjustably angularly spaced apart from each other. As projections 15 of the distributor rotor 14 rotate in the direction of the arrow, the magnetic flux of each of the coils is traversed and pulsating currents are produced in the coils in synchronism with the rotor revolutions and hence with the engine revolutions. It will be understood that the electromagnetic coils may be permanent magnets each provided with a winding coil. The pick-up coil 12 is so positioned that it produces a reference timing pulse in synchronism with the zero angle position of the engine crankshaft while the pick-up coil 11 is placed away from the pick-up coil 12 so that it produces a pulse at a timing advanced from the reference timing pulse.

Figure 2:
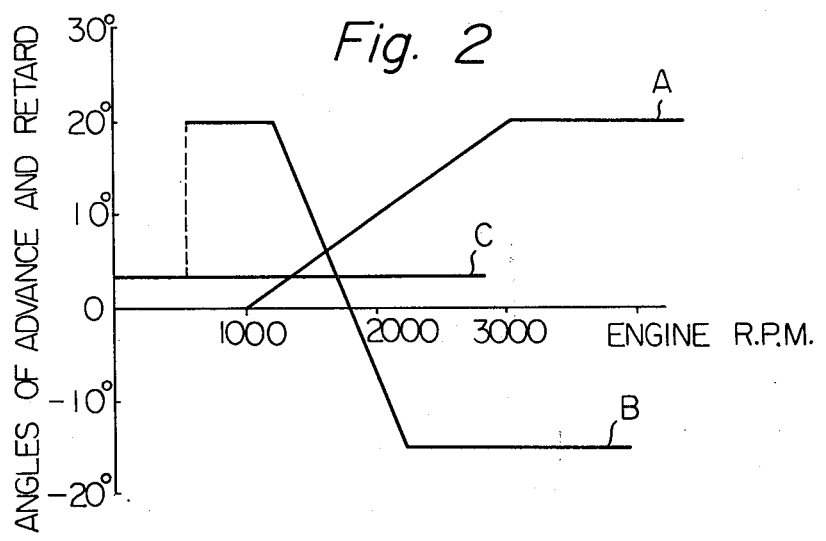
FIG. 2 is a graph illustrating spark advance and retard characteristics for varying engine operating conditions, which is useful for understanding the present invention.

In FIG. 2, the curves show spark timing characteristics for the varying conditions of the engine. Curve A represents an advance characteristic for normal engine operating conditions, and curve B represents an advance and retard characteristic for the warming-up operation, and curve C represents a constant spark advance characteristic suitable for the starting operation. Under normal and warming-up operations, ignition is provided by delaying the reference timing pulse produced by the coil 12 in accordance with the timing characteristic curves A and B. During the starting operation, ignition is effected by the advance timing pulse produced at the coil 11 in accordance with the characteristic curve C which advances the ignition timing by an amount proportional to the angular spacing between the pick-up coils 11 and 12.

In FIG. 3, a preferred embodiment of a spark timing control circuit is schematically shown and comprises generally a starting operation sensing circuit 20 in a block of broken lines, a warming-up operation sensing circuit 21, a normal operation sensing circuit 22, a conventional interruptor 23, a pulse delaying circuit 24, and function generators 25a and 25. The advance timing pulse produced from the pick-up coil 11 is applied to an AND gate 26 and the reference timing pulse produced from the pick-up coil 12 is applied to an AND gate 27. A sensor 28 senses the engine revolutions and feeds a signal "1" to the input of an OR gate 30 when the engine revolutions are below a predetermined value, for example, 100 r.p.m. A sensor 29 serves to sense the source voltage and feeds a signal 1 to the OR gate 30 when the voltage is below a predetermined level. A sensor 31 of the warming-up circuit 21 senses the temperature of engine coolant and feeds a signal 1 to the input of the AND gate 32 of the warming-up circuit and an inverter 36 of the normal operation circuit which inhibits an AND gate 34 when the temperature is below a predetermined level, for example, 30°C. When the engine is started with the change speed gear in the neutral position, a change speed gear position indicator 37 applies a signal 1 on lead 38 to the AND gate 26 energizing it.

The advance timing pulse thus appears on lead 40 and causes the interruptor 23 to produce an interrupted current through the primary winding of the ignition coil 41. In the usual manner, a high tension voltage is produced in the secondary circuit including the spark plugs 42 (although only one spark plug is shown). During the starting operation ignition is provided at a timing advanced from the zero angle position of the crankshaft. With a 1 signal being applied on lead 43, AND gates 27 and 32 are inhibited by means of inverters 39 and 44, so that the reference timing pulse is rendered ineffective.

With increasing values of engine revolution and source voltage, sensors 28 and 29 feed signals "0" to the OR gate 30 which in turn feeds a 0 signal to lead 43 and enables the AND gates 27 and 32. At this instant, the warming-up operation commences if the engine coolant temperature is below 30°C. Upon energization of the AND gate 32 the function generator 25 provides a voltage signal whose amplitude varies in accordance with the curve B of FIG. 2. The function generator may be, for example, an operational amplifier described in the Handbook of Automation, Computation and Control, Vol. 2, John Wiley & Sons Inc. pages 23–25 and 23–26. The output signals from the AND gate 27 and the function generator 25 are applied to the pulse delaying circuit 24, which may be of any conventional type as long as it delays delivery of the pulse. The pulse delaying circuit 24 delays the reference timing pulse in accordance with the applied voltage and ignition is provided at a timing which varies with the engine revolutions in accordance with the characteristic curve B. When the engine has warmed up, the sensor 31 feeds a 0 signal to the AND gate 32 and the inverter 36, and the warming-up operation ceases.

When the driver changes the gear from neutral to a drive position, an OR gate 15 places a 1 signal to the AND gate 34 and causes the function generator 25a to be energized. The function generator 25a generates a voltage signal whose amplitude varies in accordance with the characteristic curve A of FIG. 2 and is used to delay the reference timing pulse so that the reference timing pulse is delayed so much as to approach the region of the advance timing of the pick-up coil 11. Ignition is thus provided at a timing which varies with the engine revolution in accordance with the curve A.

As will be noted from the above description, the advance timing pulse is produced and used to effect ignition at an advance spark timing which is free from the voltage drop encountered during the engine starting operation. Consequently, during the starting operation a precisely controlled advanced ignition is ensured and the amount of unburned fuel emitted is minimized. After the starting operation, since the starter ceases its operation, the function generators operate on a source voltage which is not subject to any change in voltage level and therefore, precise advance and retard spark timing control is also assured during warming-up and normal operations.

What is claimed is:

1. A system for controlling the ignition timing of an internal combustion engine in response to the characteristics of an engine, comprising, in combination:
    a. means for sensing the speed of the engine and producing a signal when said speed is below a predetermined speed;
    b. means for sensing the characteristics of said engine;
    c. function generating means operable by said characteristic sensing means for relating the speed of said engine to the timing of ignition for obtaining reduced emission when said engine is driven under predetermined characteristic;
    d. a direct-current power supply for supplying said function generating means with a direct-current potential;
    e. means for sensing the voltage level of said direct-current power supply and producing a signal when said voltage is below a predetermined level;
    f. first means for generating pulses in response to the speed of said engine at a reference timing relative to the zero angle position of the crankshaft of said engine;
    g. second means for generating pulses in response to the speed of said engine at an advanced timing relative to said reference timing;
    h. means for delaying the timing of the reference timing pulses in accordance with the output of said function generating means; and
    i. means for interconnecting said engine-speed sensing means, said voltage sensing means, said first and second pulse generating means and said function generating means for enabling said second pulse generating means when one of said engine speed sensing means and said voltage sensing means produces a signal while inhibiting said first pulse generating means and said function generating means.

2. A system for controlling the ignition timing of an internal combustion engine in response to the characteristics of an engine of an automotive vehicle having a change speed gear, comprising, in combination:
    a. means for sensing the speed of the engine and producing a signal when said speed is below a predetermined speed;
    b. means for sensing the temperature of said engine and producing a signal when said temperature is above a predetermined level;
    c. means for sensing the gear positions of said change speed gear;
    d. first function generating means operable by said temperature sensing means for relating the speed of said engine to the timing of ignition for obtaining reduced emissions when said engine is warmed up;
    e. second function generating means operable by said gear-position sensing means for relating the speed of said engine to the timing of ignition for obtaining reduced emissions when said engine is driven at normal cruising speed;

f. a direct-current power supply for supplying said first and second function generating means with a direct-current potential;
g. means for sensing the voltage level of said direct-current power supply and producing a signal when said voltage level is below a predetermined level;
h. first means for generating pulses in response to the speed of said engine at a reference timing relative to the zero angle position of the crankshaft of said engine;
i. second means for generating pulses in response to the speed of said engine at an advanced timing relative to said reference timing;
j. means for delaying the timing of the reference timing pulses in accordance with the output of said first and second function generating means;
k. first means for interconnecting said engine-speed sensing means, said voltage sensing means, said first and second pulse generating means, said first and second function generating means and said gear-position sensing means for enabling said second pulse generating means when one of said engine-speed sensing means and said voltage sensing means produces a signal and said change-speed gear is at neutral position while inhibiting said first pulse generating means and said first and second function generating means; and
l. second means for interconnecting the gear-position sensing means, said engine-temperature sensing means and said first and second function generating means for enabling said first function generating means when said gear is at a driving position while inhibiting said second function generating means.

* * * * *